(12) United States Patent
Dress (10) Patent No.: US 11,228,458 B2
(45) Date of Patent: Jan. 18, 2022

(54) GROUP-COHERENT MEMORY

(71) Applicant: Lightfleet Corporation, Camas, WA (US)

(72) Inventor: William Dress, Camas, WA (US)

(73) Assignee: Lightfleet Corporation, Camas, WA (US)

( * ) Notice: Subject to any disclaimer, the term of this patent is extended or adjusted under 35 U.S.C. 154(b) by 0 days.

(21) Appl. No.: 16/799,774

(22) Filed: Feb. 24, 2020

(65) Prior Publication Data

US 2020/0267019 A1  Aug. 20, 2020

Related U.S. Application Data

(63) Continuation-in-part of application No. 15/262,391, filed on Sep. 12, 2016, now abandoned, and a continuation-in-part of application No. 15/175,685, filed on Jun. 7, 2016, now abandoned.

(60) Provisional application No. 62/241,112, filed on Oct. 13, 2015, provisional application No. 62/216,999, filed on Sep. 10, 2015, provisional application No. 62/217,003, filed on Sep. 10, 2015, provisional application No. 62/217,004, filed on Sep. 10, 2015, provisional application No. 62/217,001, filed on Sep. 10, 2015.

(51) Int. Cl.
| | |
|---|---|
| *H04L 12/40* | (2006.01) |
| *G06F 9/54* | (2006.01) |
| *G06F 9/52* | (2006.01) |
| *H04L 12/18* | (2006.01) |

(52) U.S. Cl.
CPC ........ *H04L 12/40156* (2013.01); *G06F 9/524* (2013.01); *G06F 9/541* (2013.01); *H04L 12/1845* (2013.01); *H04L 12/4015* (2013.01)

(58) Field of Classification Search
CPC ........... H04L 12/40156; H04L 12/4015; H04L 12/1845; G06F 9/541; G06F 9/524; G06F 9/5033; G06F 9/5066; G06F 9/528; G06F 9/542; G06F 9/5016
See application file for complete search history.

(56) References Cited

U.S. PATENT DOCUMENTS

| | | | | |
|---|---|---|---|---|
| 6,014,690 A | * | 1/2000 | VanDoren | ........... G06F 12/0813 709/201 |
| 6,594,736 B1 | * | 7/2003 | Parks | ................... G06F 12/0815 709/217 |

(Continued)

*Primary Examiner* — Umar Cheema
*Assistant Examiner* — James Ross Hollister
(74) *Attorney, Agent, or Firm* — Schultz & Associates, P.C.

(57) ABSTRACT

Operating a data distribution including a data distribution module and a plurality of host-bus adapters coupled to the data distribution module can include defining a coherent group that includes a set of members that includes the plurality of host-bus adapters; providing a group-coherent memory area in each of the set of members; and initiating a one-to-all broadcast message from a one of the plurality of host-bus adapters to all of the set of members when the one of the plurality of host-bus adapters requests a write to its local group-coherent memory area. The group-coherent memory area in each of the set of members is physically mirrored with a temporal coherence and no semaphores or access enables are required to achieve the temporal coherence of the coherent group.

9 Claims, 4 Drawing Sheets

(56) References Cited

U.S. PATENT DOCUMENTS

| | | | |
|---|---|---|---|
| 6,704,847 B1* | 3/2004 | Six | G06F 13/18 455/403 |
| 2004/0096222 A1* | 5/2004 | Cagenius | H04B 17/19 398/115 |
| 2004/0117562 A1* | 6/2004 | Wu | G06F 12/0866 711/147 |
| 2005/0177831 A1* | 8/2005 | Goodman | G06F 9/30087 718/100 |
| 2008/0091884 A1* | 4/2008 | Piry | G06F 12/0831 711/141 |
| 2010/0023707 A1* | 1/2010 | Hohmuth | G06F 9/3834 711/152 |
| 2014/0133493 A1* | 5/2014 | Miliavsky | H04L 45/44 370/406 |
| 2016/0321012 A1* | 11/2016 | Clark | G06F 3/061 |

\* cited by examiner

GROUP-COHERENT MEMORY

CROSS-REFERENCE TO RELATED APPLICATIONS

This application is a continuation-in-part of U.S. application Ser. No. 15/175,685, filed Jun. 7, 2016. This application is a continuation-in-part of U.S. application Ser. No. 15/262,391 filed Sep. 12, 2016, which claims priority benefit from U.S. Provisional Application No. 62/216,999, filed on Sep. 10, 2015, and U.S. Provisional Application No. 62/217,001, filed on Sep. 10, 2015, and U.S. Provisional Application No. 62/217,003, filed on Sep. 10, 2015, and U.S. Provisional Application No. 62/217,004, filed on Sep. 10, 2015 and U.S. Provisional Application No. 62/241,112, filed on Oct. 13, 2015. The patent applications identified above are incorporated here by reference in its entirety to provide continuity of disclosure.

BACKGROUND OF THE INVENTION

A particular memory model is advantageous in computing architectures for multiple tasks, whose threads are distributed across multiple and separate hosts, requiring access to the same data. Such tasks may be viewed as a working group, dealing with different aspects of the same problem while reading from and writing to the same relative memory locations within each individual host. In a cluster-wide shared architecture, this expanded requirement is often handled by specialized hardware and software in addition to the usual networking hardware for interconnecting the cluster. The goal is to move data between different hosts across the entire cluster such that a portion of local memory in each host is maintained as a "mirror image" of the same relative memory in any other host.

Moving memory contents around to meet coherency needs can materially slow a parallel application. What is desired is a method of automatically updating mirrored copies across a computing cluster with without the addition of specialized hardware.

SUMMARY OF THE INVENTION

There is a need for the following embodiments of the present disclosure. Of course, the present disclosure is not limited to these embodiments.

According to an embodiment of the present disclosure, a method comprises operating a data distribution system including a data distribution module and a plurality of host-bus adapters coupled to the data distribution module including defining a coherent group that includes a set of members that includes the plurality of host-bus adapters; providing a group-coherent memory area in each of the set of members; and initiating a one-to-all broadcast message from a one of the plurality of host-bus adapters to all of the set of members when the one of the plurality of host-bus adapters requests a write to its local group-coherent memory area. According to another embodiment of the present disclosure, an apparatus comprises a data distribution system including a data distribution module and a plurality of host-bus adapters coupled to the data distribution module, wherein operating the data distribution system includes defining a coherent group that includes a set of members that includes the plurality of host-bus adapters; providing a group-coherent memory area in each of the set of members; and initiating a one-to-all broadcast message from a one of the plurality of host-bus adapters to each of the set of members ensuring that when the one of the plurality of host-bus adapters request a write, to update its local group-coherent memory area, the one-to-all broadcast message maintains temporal memory coherency across all of the set of members of the coherent group.

These, and other, embodiments of the present disclosure will be better appreciated and understood when considered in conjunction with the following description and the accompanying drawings. It should be understood, however, that the following description, while indicating various embodiments of the present disclosure and numerous specific details thereof, is given for the purpose of illustration and does not imply limitation. Many substitutions, modifications, additions and/or rearrangements may be made within the scope of embodiments of the present disclosure, and embodiments of the present disclosure include all such substitutions, modifications, additions and/or rearrangements.

BRIEF DESCRIPTION OF THE DRAWINGS

In the detailed description of the preferred embodiments presented below, reference is made to the accompanying drawings.

DETAILED DESCRIPTION OF THE INVENTION

In the description that follows, like parts are marked throughout the specification and figures with the same numerals, respectively. The figures are not necessarily drawn to scale and may be shown in exaggerated or generalized form in the interest of clarity and conciseness.

Figure 1:
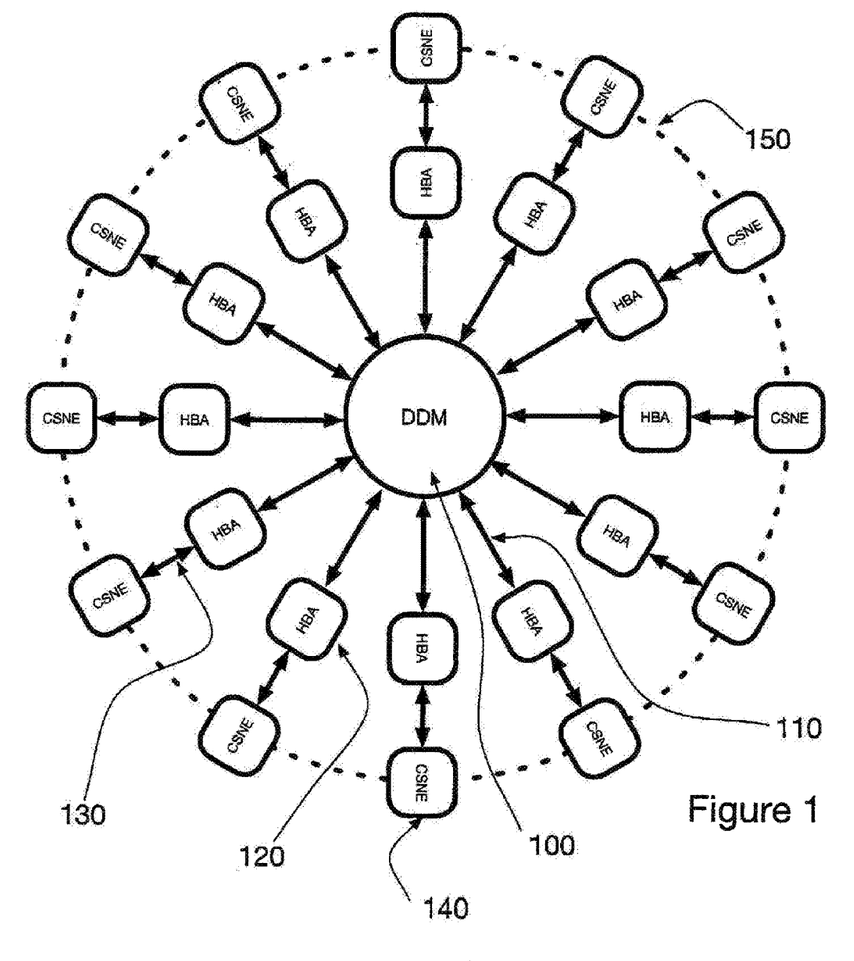
FIG. 1 illustrates the data-distribution system (DDS) tight-cluster interconnect.

In FIG. 1, The invention relates generally to the field of methods and devices for maintaining coherence between mirrored copies of a task's or program's memory within a cluster of interconnected computers or host devices.

The invention presented in this disclosure provides a coherent group memory implemented specifically for a tight cluster of servers or other host devices such as found in database installations, high-performance computing applications, and anywhere parallel or cooperative programming may be needed. The coherency mechanism described in this disclosure is supported by the same hardware used to interconnect the cluster and is implemented by defining a coherent memory area in each host and ensuring that a write to that area by any thread in any host initiates a one-to-all broadcast message from the host requesting the write to all hosts in the cluster, including itself. That is, the method is based on a single group whose task it is to maintain temporal memory coherency across the cluster.

The interconnect mechanism describes a message-distribution system or DDS consisting of host bus adapters (HBAs) and a data-distribution module (DDM) where the HBAs provide an interface mechanism between a host and the DDM. The concept, which may also be called "virtual shared memory", is based on the unique multicast mechanism inherent in the DDS, which can include a data-distribution module (DDM) with host-bus adapters (HBAs) mediating between hosts and the DDM.

The following sections describe how to achieve a coherent memory mirrored across multiple stations when defined by a single group. The physical memory in the DDS is mirrored (each host has a copy of the coherent memory) where each host in the system belongs to the single coherence group that, while physically mirrored across all hosts or servers, is accessed as if it were a single memory asset shared by the entire cluster. The difference is that no semaphores or access enables are required to achieve a temporal coherence of the cluster's "shared" memory.

At the architectural level, the DDS is based on multicast; that is, multicast is the native operational mode of the DDS in that every message injected into the system is treated as multicast having one or more destinations. This native multicast mechanism is built in at the hardware level or physical layer of the DDS. Messages are guided through the DDM (from HBA to HBA) by means of a destination field in the start-of-message (SOM) header, which directs the message along internal paths from the input port to the specified output ports.

In addition to the multicast, multiple priority levels are built in at the architectural design stage. The lowest and highest priorities are reserved for system functions such as flow control and system maintenance. The message priorities are maintained as separate information channels from a transmitting HBA through the DDM to the receiving HBA.

A third design feature of the MDA is its support for "fast-priority messages" or FPMs which are single-frame messages whose purpose is to maintain efficient control over system functions. In the output stage of the DDM and HBA, these messages are assigned priority P0 which means that, if queued in a P0 queue, they have transmission priority (either to the HBA or to the DDM).

Any message sent by a host that is meant to update the coherent memory is assigned to channel P1 while any other messages involving memory-to-memory are assigned priority channels such as a P2 or P3 channels with lower priority than channel P1. All flow control and other critical semaphores take place on the P0 channel. Such control frames bypass the internal distribution mechanism of the DDM and carry out their specific functions without interfering with normal message traffic, other than introducing a one-frame delay. These features are discussed in detail in the above-referenced patent application.

Based on the above description, a set of mirrored memory locations distributed over the cluster is maintained in a coherent fashion by ensuring that any host updating its local copy of the coherent memory also sends out a one-to-all broadcast to all other hosts in the cluster.

The memory mechanism proposed here is meant to ensure a read-coherence across mirrored copies of a single, privileged group and the method properly supports coherence only in a tight computing cluster. There are no read requests to the local copy other that the usual reads supported by the kernel. Additionally, there are no special write locks beyond normal memory DMA writes.

The tight-cluster constraint may be relaxed by a simple handshake mechanism between the HBA and the host receiving a memory update and the single group may be expanded to multiple groups while retaining the single coherence group for maintaining coherent memory for a single cooperative-computing task. However, these enhancements require architectural changes to the interconnect and must be supported by software enhancements to the application programming interface.

In summary, the memory model disclosed here maintains a group-based, system-wide coherent memory for those hosts having membership in the special coherent group. Coherence in this special group is achieved at the architectural level of the DDM by operationally restricting the P1 channel to accept only group-memory updates in the form one-to-all messages. These updates are effectively broadcast from the host issuing the update to all other hosts in the system. Due to the priority mechanism, any memory update is sent from the updating HBA to the DDM where it is distributed to the remaining hosts without interference or delays from any other system messages. A feature inherent in the way the DDM processes multicast ensures that the receiving HBAs will simultaneously receive the same update information as long as they are restricted to the P1 channel. Each HBA will pass on its copy of the update at the correct priority to the host by means of a DMA action, ensuring that the memory images across the cluster will be updated at the same time.

There is no need for locks and semaphores in this basic model. Thus, coherency is maintained across all system hosts without effort beyond reserving the highest message priority for memory updates. The other priority channels are free to handle whatever message traffic is required and do not interfere with the coherency of the memory update. Thus, other memory locations may receive messages on the lower-priority channels, but such are not guaranteed to be coherent across their respective groups.

Otherwise stated, the basic concept supports multiple groups allowing other modes of communication between hosts (such as maintenance and reporting functions). The coherence group is a preferred group whose only access is by means of the P1 priority channel and this channel may be reserved only for coherent memory updates. The memory images of the other groups are consistent in that a group write updates all images within a group just as done for the coherent group. However, these updates are not guaranteed to maintain a strict read coherency as does the privileged group by virtue of its temporal coherency.

Referring to FIG. 1, DDS tight-cluster 150 consists of central data-distribution module (DDM) 100 connected to host-bus adapters (HBAs) 120 via fiber connections 110. Each HBA 120 connects via connections 130 to host or CSNE 140 (computing, storage, or network element) such that these elements are fully connected to each other by means of DDM 100. Each host or CSNE 140 contains an identical region of memory, perhaps with different absolute addresses within each host. It is this collection of memory images that is required to remain coherent with precisely the same contents at any instant in time. There are several classes of "coherent" memory. The most common one may be termed "read coherent" in that any time any host is allowed to read the same relative memory location, the same value is obtained; enforcing read coherence usually requires the use of locks and semaphores. The most stringent type of coherent memory is temporally coherent in that reads are not delayed or controlled by semaphores, yet a random read by any host to its local copy of the coherent memory is guaranteed to return the same value.

Figure 2:
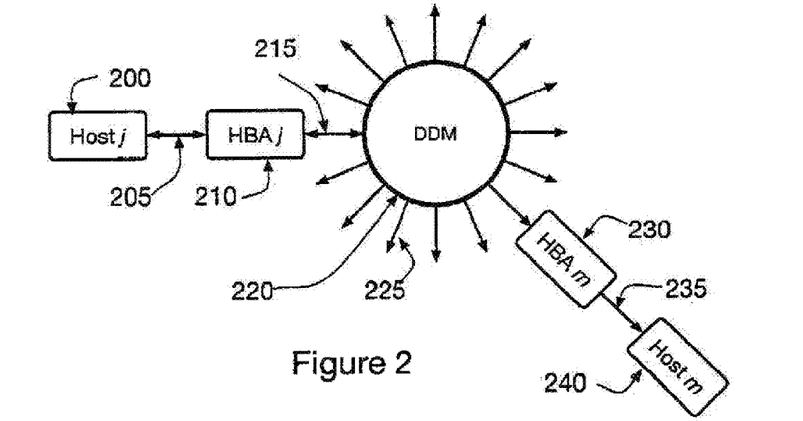
FIG. 2 depicts a coherent memory update process.

Referring to FIG. 2 and assume for now that there is no other traffic on priority channel P1 through DDM 220. Then a memory-update message broadcast from Host j 200 will enter HBA j 210 via connection 205 and be prepared according to the prescription disclosed. Each host receiving the update is a member of a "coherent group" that is defined as a working or cooperative group of processes (or threads or tasks), one residing in each host belonging to the group, such that group communication is restricted to and reserved for priority channel P1 as described in the above-referenced patent application.

Since the group-coherent update is a broadcast message wherein the transmitting host is numbered among the recipients, the message is prepared with a group index referring to the subscription table entry where all bits are set, indicating that all exits in the DDM are to transmit copies of the update. This message then enters DDM via connection 215 with the start-of-message header (SOM) prepared with the aforementioned group index as its destination and a priority indicating the P1 priority channel and the offset into the mirrored copies indicating the location in each mirrored image that is to receive the update. The end-of-message (EOM) is prepared as normal with a priority designation of P1, a source index of j, and a CRC-32 computed over the data portion of the update as described in detail in the above-referenced patent disclosure.

The DDM behaves as described in the referenced disclosure and the coherent update is distributed to each P1 output FIFO simultaneously as there are no prior messages causing delays in any of the paths. Copies of the update then leave all exit ports along connections 225 to each connected HBA such as HBA m 230, arriving in all HBAs, including HBA j 210, simultaneously since there is no other traffic in the cluster to differentially delay any of the updates. In a similar manner, since HBA m 230 and HBA j 210 are free to process any messages from the DDM without delay and such messages are written by direct-memory access (DMA) directly into the targeted memory areas at the uniformly specified offset positions from the base address in each target host, such as host m 240 via connection 235 and host j 200 via connection 205, the updates arrive simultaneously in all copies of the group memory (within a small differential jitter of a few nanoseconds due to inhomogeneities in the various physical paths).

The mechanism for the coherent update occurs when a process running a host completes a calculation or receives a message (not directed to its group-coherent memory) that is to be written out to the coherent group. The write in this case may be trapped by the operating-system kernel in one possible implementation of the process. The kernel then initiates a broadcast to all members of the coherent group, including a send to self. This update then undergoes the process described above so that all copies of the group-coherent memory are updated synchronously or nearly so within the time required for a single update to traverse the cluster.

The process disclosed herein does not prevent the use of semaphores based on the fast-priority message for maintaining flow control or other system functions described in the above-referenced patent disclosure. The process allows multiple simultaneous coherent updates from different hosts. Such updates will, perhaps, reach the DDM simultaneously where an arbitration mechanism, disclosed in the above-referenced patent application, will maintain message order such that each message arrives intact in a serial fashion. Precedence of simultaneous coherence updates to same mirrored location must be resolved at the application level by, perhaps, including a priority of some sort within the body of the message. Such issues do not alter the method or effectiveness of the disclosed process.

Embodiments of this disclosure can include a method of maintaining a coherent memory for an interconnect system having the capability to (1) define a coherent group and allocate a corresponding mirror memory area in each member of the group; (2) broadcast messages such a group such that they arrive at their destinations simultaneously or nearly so; and (3) such that the group member initiating the message also sends the same message to itself through the same mechanism. Embodiments of this disclosure can include a coherent memory update that takes place over the same DDS that is used to interconnect the tight cluster. Embodiments of this disclosure can include a method of coherent updates that are carried out by means of a special coherent group. Embodiments of this disclosure can include a method of coherent memory update across a tight cluster that is lock- and semaphore-free, wherein updates take place over a high-priority channel exclusively reserved for such updates. Embodiments of this disclosure can include a method of coherent updates that are initiated by a write request to a local copy of the coherent memory. Embodiments of this disclosure can include a coherent memory update that can be used in conjunction with existing tight-cluster interconnects as an additional, add-on system requiring another set of HBAs, connections, and the DDM adjacent to and parallel with an existing switched interconnect.

Figure 3:
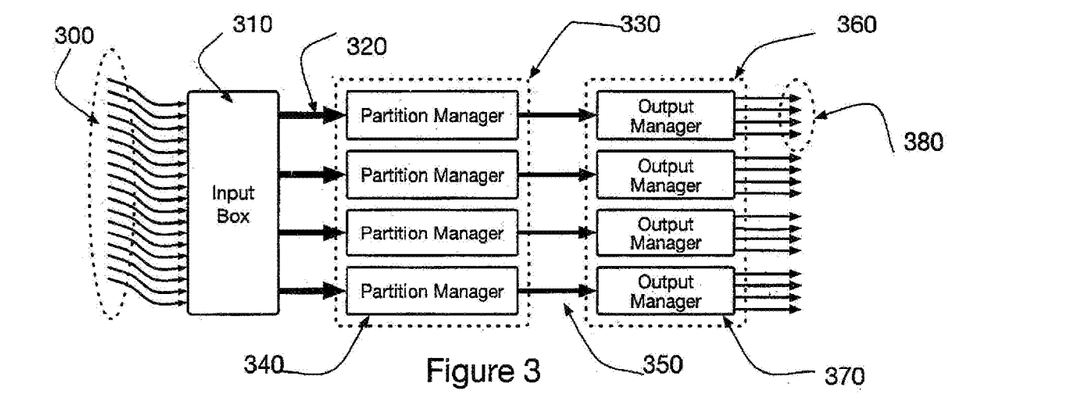
FIG. 3 shows the several components and their interconnections that define a data distribution module (DDM).

FIG. 3 illustrates the data flow to, through, and from the DDM. Output lines in the HBA are connected to the DDM's input stage, input box 310 via fiber connections 300. Input box 310 extracts and decodes the destination information from the SOM to select the partition(s) and priority channels for queuing the incoming message in middle box 330. The message is then sent along connections 320 to chosen partition managers 340 in middle box 330, where it is either queued, if a delay is required, or it is immediately passed on to output manager 370 in output box 360 via connections 350. The partition concept extends from middle box 330 through output box 360. The priority structure is maintained throughout these partitions and priority interrupts, where a higher-priority message from an HBA can interrupt a lower-priority one by a simple path change made in input box 310, allowing the stream of incoming frames on connection 300 to switch to the higher-priority queue within a partition manager 340.

Partition manager 340 makes a connection to output manager 370 in the same partition when the SOM is cleared for transmission to output box 360. Output manager 370 then queues the message frames in a FIFO corresponding to the priority and exit port specified by the SOM's destination code. The message is then passed directly to the output port in output manager 370 where it is converted to a serial optical signal and sent along output fiber 380, or it is held in output manager 370 should the port be busy with another transmission.

Figure 4:
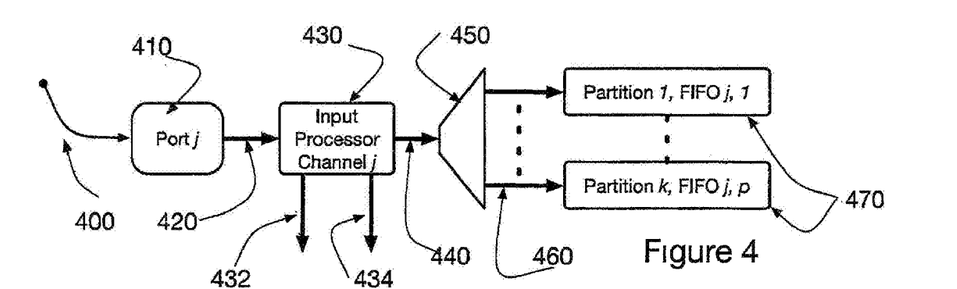
FIG. 4 lays out internals of the data distribution module's (DDM's) input stage.

In greater detail, suppose HBA j sends a message prefixed by a SOM containing the destination, priority, and an offset. This message will appear on input line 400 and enter input box 310 on port 410 where it is converted to an electrical signal, deserialized, and sent to input processor channel 430 via parallel data lines 420. Input processor channel 430 extracts the destination and priority from the corresponding fields in the SOM. The destination is an index into a subscription table maintained in input box 310 by the aforementioned maintenance messages. Input processor channel 430 retrieves the exit code from the subscription table and decodes this information to obtain (1) the list of partitions that are to receive copies of the message and (2) the exit indices in the form of an exit map for each of the receiving partitions.

The exit map for each partition is sent to distributor 450 via connections 440 which contains a separate path for each of the partitions. Distributor 450 sends a copy of the SOM accompanied by the relevant exit map to specified partition FIFO 470 via connection 460 and sets a mux in distributor 450 to connect the message channel to the indicated partition FIFO 470.

A consequence of the selection process effected by input processor channel 430 and implemented by distributor 450 is to send the incoming message frames from channel j onto selected connection 460 to be queued into selected partition FIFOs 470 according to exits decoded from the destination and priority fields carried by the SOM. Note that a SOM may specify a single priority and multiple partitions. All sub partitions k,p belonging to input index j indicated in FIG. 4 will receive a copy of the message so directed.

Connection 432 transfers any FCM frame transmitted by HBA j directly to output box 360, bypassing middle box 330 to maintain proper flow control from exit port j. Similarly, connection 434 transmits any response requested by a maintenance message received by the input stage from HBA j for queuing in a maintenance output FIFO (see below).

Considering connections 320 in FIG. 3 together with connections 460 in FIG. 4 that are available to any input port, it becomes clear that a message on connections 300 of FIG. 3 can be sent along a path to any of several partition FIFOs 470 that are specified by the destination and priority fields.

Figure 5:
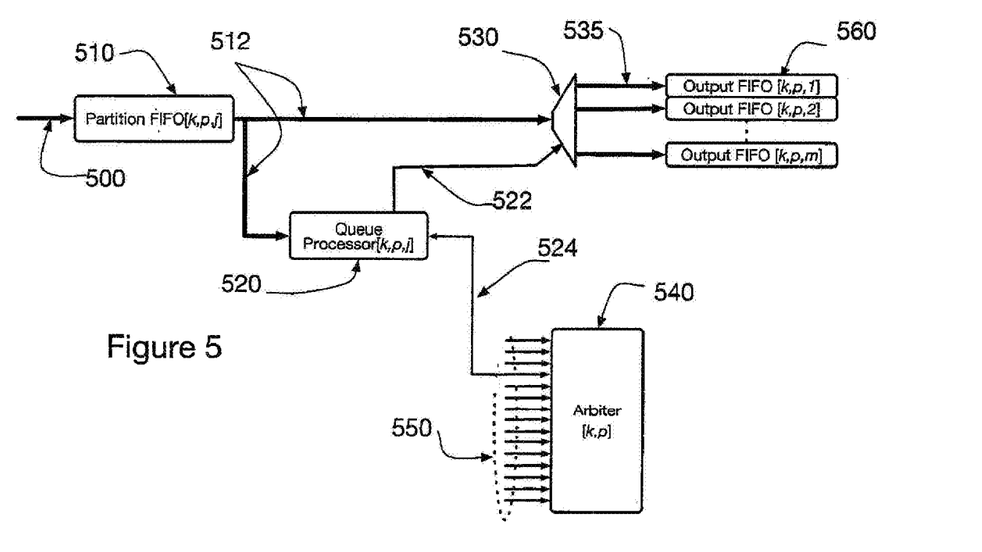
FIG. 5 illustrates the mechanism from the FIFOs (First In First Out buffers) in the interior of the data distribution module (DDM) to the output stage.

FIG. 5 illustrates the data flow from middle box 330 to output box 360 as shown in FIG. 3 and subsumed in partition manager 340. Partition FIFO[k,p,j] 510 where k specifies the partition, p the priority, and j the input port, receives frames introduced by a SOM on input line 500 as determined by input processor channel 430. Each partition FIFO[k,p,j] 510 has an associated queue processor 520 (indexed by the same {k,p,j} as the FIFO) that has access to the head or output frame residing in that FIFO via connection 512. Queue processor 520 may then determine if a frame is present or not, if the frame is a SOM or EOM, or simply a data frame.

When a SOM is identified as presenting a message with a set of exits {m} (for the sub partition k,p), this information is passed to corresponding arbiter[k,p] 540 via connections 524. Dotted line 550 represent connections to and from the remaining queue processors [k,p,{j}] where {j} represents a collection of indices representing all input ports in the DDM.

Arbiter[k,p] 540 compares the requested set of exits {m} with an internal exit map that maintains the state of the set of muxes 530 corresponding to the entire set of Output FIFOs. If the bits in this map corresponding to the set {m} are not set, a release is granted by sending notification back to queue processor 520, which sets state of muxes 530 via lines 522 so that the SOM may be transferred to the set of output FIFOs[k,p,{m}] 560 via selected connections 535. The set of locations corresponding to {m} are then set in the map to prevent conflicting messages from being released into output FIFO[k,p,j] 560.

If the set {m} of locations in the bit map are not all clear, the request is not granted and the SOM must wait in partition FIFO[k,p,j] 510 until such time that any conflicting messages have completed their transit from middle box 330 to output box 360.

The state machine in each queue processor 520 periodically queries arbiter[k,p] 540 as long as a SOM remains at the front of the partition FIFO[k,p,j] 510, ensuring that any pending message will be released as soon as the map bits {m} are clear.

Once the SOM has been released and transferred to specified output FIFOs 560, the rest of the message follows by a handshake process controlled, for example, by read- and write-enable flags in the transmitting and receiving FIFOs. These flags reflect the current state of their respective FIFOs in the preferred embodiment, with the read enable set when there is a frame present in partition FIFO[k,p,j] 510 and the write-enable set in output FIFO[k,p,m] 560 as long as there is room in that FIFO for the next frame to be transferred. Note that all output FIFO[k,p,m] 560 in the released set {m} must be write enabled for transfer to take place.

The transfer continues, frame-by-frame, until an EOM is transmitted. This event, detected by the Queue Processor 520, clears the bits {m} in the exit-port map in arbiter[k,p] 540, thus allowing any following message access to those output FIFO[k,p,m] 560 that received the EOM.

Figure 6:
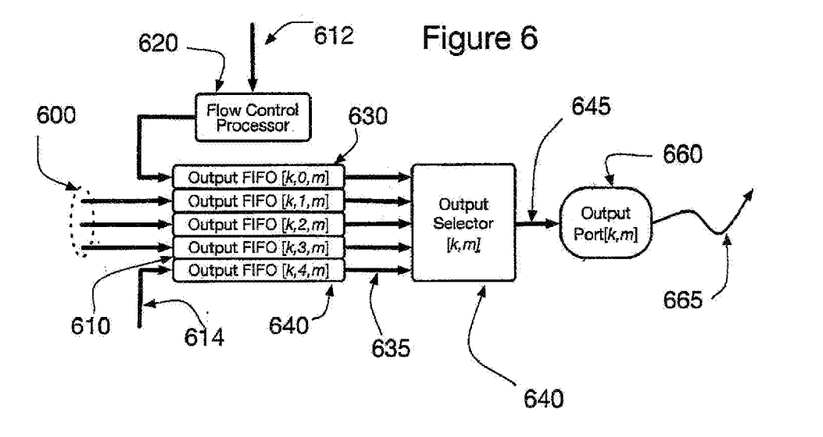
FIG. 6 depicts an output process that allows priority interrupts.

FIG. 6 illustrates the role of output manager 370 in output box 360 as a process managing message traffic from all output FIFOs [k, {p}, m] 560 to output port[k,m] 660 in partition k for the specified output m in that partition. {p} is the set of message priorities supported by the MDS. This manager for partition k serves only exit m by mediating the traffic from all priorities from 0 to P+1, where P is the number of message priorities supported by the MDS. There is one such manager for each of the n output ports in the MDS. FIG. 6 depicts the preferred embodiment with P=3, resulting in a total of 5 output FIFOs 630 in each of the K partitions.

Inputs 600 from the set of Middle Box Partition Managers as shown in FIG. 5 send message frames to Output FIFOs 610 from each message priority as mediated by arbiters[k,p] 540 in partition k for any or all of the P priorities. Input 614 allows any maintenance message prepared by input processor channel 430 on input channel j to be queued in Output FIFO [k,4,m] via connection 434 where m=j mod M so the response is sent to the requesting HBA j. Likewise, input 612 contains information regarding any of the partition FIFOs 470 that generate a flow control exception. Input 612 also transmits any FCM sent by an HBA and processed in input processor channel j 430 via connection 432. Both of these notifications are processed by flow control processor 620 which either formats an FCM for delivery to HBA j in the case of a notification from partition FIFO 470 or controls the flow of frames to the output port[k,m] in the case of a notification from the input processor channel j.

If one or more of the output FIFOs[k, {p}, m] contain at least one frame, output selector[k,m] 640 selects appropriate output FIFO 610 or 630 depending upon priority, via connections 635 for transmission to output port [k,m] 660 via connection 645. Output port[k,m] 660 then serializes the frame of 64 bits (in the preferred embodiment), converts the electrical signal to a serial optical stream, and injects the bit stream onto optical fiber 665 leading to HBA j. The details of this conversion and transmission process are well known to practitioners of the art of serial digital data transmission via optical fibers.

Externally (messages flowing into or out of the system of hosts, HBAs, and DDMs) one of the common protocols, such as Ethernet, may be used. Internally, messages are wrapped in the SOM and EOM for efficient and reliable transfer between hosts. In normal operation, the host sends a data packet in the form of destination, priority, message length and a sequence of bytes containing the message payload to its HBA. The payload contains arbitrary information and may include other communication protocols for routing outside the MDS. The function of the HBA is to decompose these data into frames (of 64 bits in the preferred embodiment), prefix the sequence of frames with the SOM control frame which contains information as to the packet's destination, priority, and offset into the receiving host's memory for the RDMA function. The HBA also prepares and appends the EOM control frame which contains a 32-bit CRC error-detecting code and a source designation identifying the transmitting HBA.

Figure 7:
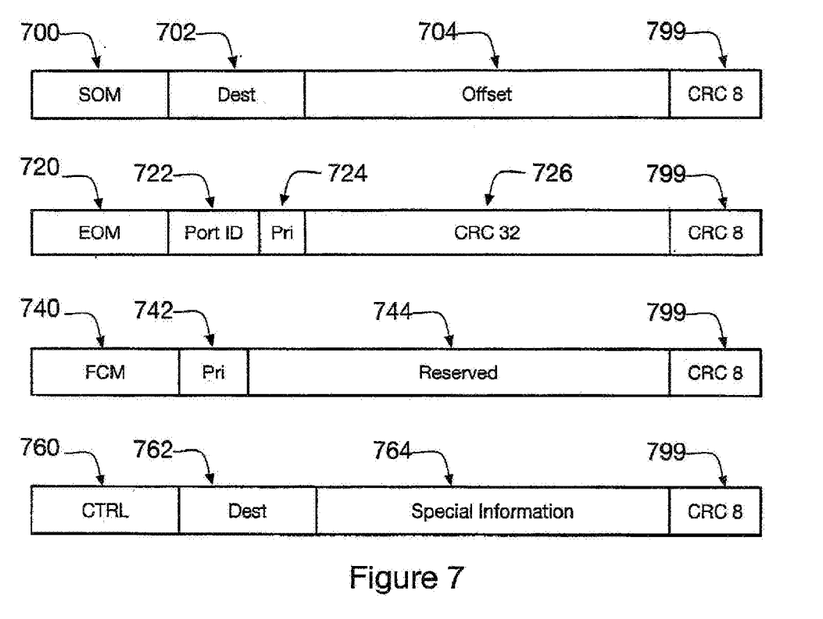
FIG. 7 defines the control-frame protocol fundamental to the operation and control of the distribution of messages.

FIG. 7 illustrates the MDS' transmission and control protocol in the preferred embodiment. Variations on this basic theme in keeping with the essential functions of group identification for multicast, DMA access into the destination memory, and reliability are, of course, possible. Each of these control frames is 64 bits long with the first section of the frame reserved for the control type (SOM 700 in the case of SOM header, EOM 720 in the case of EOM tail, FCM 740 for FCMs, and CTRL 760 for other types of control frames). These frame-type identifiers (700, 720, 740, and 760) are decoded in Input Box 310 and result in different actions in the input box 310 as discussed above. Each control frame has error code 799 occupying the final byte of the frame. This code may be used for error detection or error correction, depending on the algorithm used to compute the code; both operations are possible, but generally require different state machines in the HBAs and a different error-check in during the input-stage process.

The control-type identifier takes from 6 to 12 bits depending on the serial interface used to transmit and receive the information. In the preferred embodiment, these identifiers require 4 bits allowing for 16 different control types. The prefix bits 66:64 in the 64b66b encoding identify any frame as to a control or a data frame (or an error) according to the standard protocol for this encoding. Dest field 702 contains a group identifier of 12 bits in the preferred embodiment, allowing a full 2048 groups to be identified in the DDM (whose subscription table, in this case, would contain 2048 entries). Offset field 704 contains an offset into the memory of the destination offset from a base address, which specifies the start of the memory reserved to the specific group receiving the message.

The EOM is constructed in the same manner with EOM 720 including of 4 bits in the preferred embodiment. Field port ID 722 contains a numerical identification of the HBA sending the message. This identification may be used in the receiving HBA or host to prepare an acknowledgement (ACK) or negative acknowledgement (NAK) to demand a resend should the MDS operate under a specific error-recovery protocol. The EOM frame also optionally contains priority 724 field that may be used for a variety of security and recovery purposes (not discussed in this disclosure). The main function of the EOM frame is to convey the CRC 32 field 726 so that the integrity of the data frames lying between the SOM and EOM may be verified. This check is made in the receiving HBA, where, in case of an error, the entire message may be dropped or reported to the host so that a recovery or retransmission-request process may be initiated.

Each CRC 8 error code 799 contains a check sum or error-correcting code as describe above to protect the integrity of the first 56 bits of the control frame. In this way, essential control frames, such as FCMs for flow control, may be acknowledged via an ACK control frame (CTRL 760). Error code 799 for the SOM frame causes the frame and entire message to be dropped in case of an error. This prevents a catastrophic system error where the wrong host could have its memory overwritten or the wrong memory location in a valid host could be overwritten. Since error code 799 is checked in input processor channel 430, the transmitting HBA may be notified immediately by an error FPM CTRL 760 passed directly to the correct output FIFO 630. In this case, the transmitting host would have the option to resend the message. If an error in the SOM is detected in the receiving HBA, the receiving host would have the option to request a resend by extracting the identification of the sending host from the EOM.

The FCM control frame contains priority field 742 that contains a bit map of the combined state of the Partition FIFOs[k,p,j] receiving information from HBA j. This allows HBA j to either halt or restart a transmission from any of the Priority FIFOs. The FCM control frame also includes reserved field 744 for information input.

Other types of control frames, such as CTRL 760, are comprised of dest field 762 which contains a group identifier of 12 bits, as previously described. The control frame also includes special information field 764 for information input.

Error code 799 in an EOM transmission to the DDM would initiate much the same action as described in the previous paragraph. An EOM error detected in the receiving EOM may require a more general type of error recovery. However, if error code 799 were an ECC (error-correcting code) such as Hamming (63,57) code, most all errors in the control frames could be corrected without the need for error-recovery in the host. Of course, this depends on the random bit-error rate experienced by the physical transport layer (in the preferred embodiment, this rate is experimentally $10^{-16}$, meaning that the frequency of occurrence of an uncorrectable error in a control frame would be vanishingly small).

It is seen, by the above discussion, that the control frames presented in FIG. 7 allow a versatile and secure operation of the MDS. Data integrity is protected end-to-end, from transmitting HBA, through the DDM and over the fiber connections, to the receiving HBA. Multicast messages (see the discussion on groups below) are supported at both the internal protocol level and by the processes inherent in the DDM from input box 310, through middle box 330, to output box 360.

The above detailed description of the drawings explains the relationship between the message header and the self-routing process that is inherent in the SOM's various fields and the mechanism of message management illustrated in FIGS. 3, 4, 5, and 6. A destination for a message includes two parts: the group ID and the offset. The group ID, in the preferred embodiment, serves as an index into a table of group subscriptions, said table being located in input box 310 for efficient access to the process that directs any message to the correct partitions and destinations.

Groups are defined at the application level and their table entries are communicated to the DDM by maintenance messages generated by a group manager process in a particular host. Such messages are directed the DDM itself and are not passed through to other hosts.

Fast priority messages, such as the FCMs, allow the MDS to respond quickly and efficiently to a variety of situations, from FIFO management to reporting component failures in a timely fashion. Such messages are quick to transmit since each includes a frame of 64 bits that is transmitted at wire speed to any location in the cluster. The brevity and speed of these control messages enables a rapid system response to changing conditions as well as supports a graceful degradation of the system when hosts or HBAs are lost.

The full impact of the self-routing packet is not fully evident until a fabric of multiple interconnected MDS modules are deployed. At each step across a fabric, the SOM opens a path in the most direct and efficient manner available to it at the moment it enters a fabric module. Path segment availability information is continually updated throughout the fabric by the back-pressure concept based on the FCMs as discussed above. The advantage is that a global view of the state of message traffic is not required; indeed, a global supervisory control function based on such global knowledge, with its attendant reliance on specialized spanning-tree algorithms, is known to be unreliable and certainly adds to latency across the fabric. These issues are simply not present in a DDM fabric where each SOM effects path decisions as the message traverses the fabric.

Figure 8:
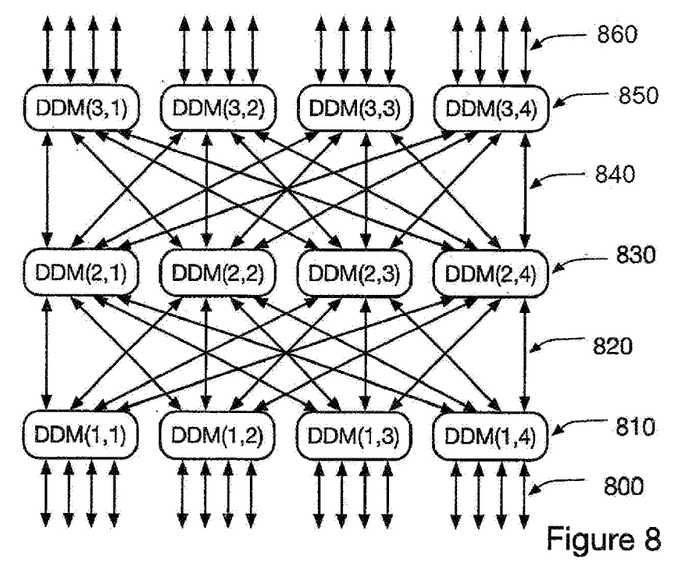
FIG. 8 gives an example of a type of fabric of data distribution modules (DDMs).

A DDM fabric includes multiple identical DDMs interconnected according in a specific topological arrangement such as a Clos or hypercube topology, to give two examples. An example of the Clos topology is shown in FIG. 8 which includes three layers of DDMs each with 8 bidirectional ports, is labeled by its position in the two-dimensional array with the first index referring to the row and the second to the column position in the array. Connections 800 and 860 are to the HBAs in the bottom and top rows, respectively, while connections 820 is between row 1 and row 2 HBAs and connections 840 are between row 2 and row 3 HBAs such that each HBA in a row is connected to every HBA in an adjacent row. Row 1 and row 3, labeled 810 and 850, respectively, comprise the outer rows while row 2, labeled 830 is the inner row. A Clos fabric based on modules with n ports contains 3/2 n fabric modules (interconnects), $2(n/2)2$ connections to HBAs, and $n^2/2$ interior connections between rows. The maximum number of hops to reach any HBA from any other, also known as the fabric diameter, is 3 for the Clos network. This topology is significantly more efficient in number of hops and hardware required than a tree structure interconnecting the same number of HBAs.

For such a fabric to support the inherent advantages of the self-routing messages described above, the subscription tables for multicast routing must be tailored to the specific topology. In the case of the Clos network of FIG. 8, each DDM requires a subscription table based on its location (or index pair) within the fabric so that the destination carried by an entering SOM is mapped to the correct output ports. The details depend on the assignment of HBA indices as well. The computation of these tables is based on a simple algorithm and the tables may be updated, with group membership changing as the application demands. Each subscription table is maintained by the process described above for maintenance messages.

Embodiments of this disclosure can include the use of a simple subscription table containing an exit map for each defined group. In embodiments of this disclosure, traffic flow through a fabric of identical DDMs depends the contents of the subscription table in each DDM.

Embodiments of this disclosure can include the fast-priority message that uses the same data links between MDS components as other messages. Most interconnect systems are based on Ethernet or Infiniband that both require much longer control messages than the fast-priority message 64 bits and/or are made over separate physical connections. Agile flow control based on the fast-priority message does not require additional connections or access to a control plane or supervisory traffic manager.

DEFINITIONS

The phrase end-to-end partitioning of message pathways is intended to mean partitioning of the message pathways from a CSME (computing, storage, or network element) to another CSME, for instance a priority channel from a computing element through a host-bus adapter through a data distribution module through another data distribution module then through another host-bus adapter and then to a storage element. The phrase multiple priority levels is intended to mean three or more priority levels, for instance five priority levels including a highest priority channel reserved specifically for fast priority messages and a channel reserved specifically for maintenance functions. The terms program and software and/or the phrases program elements, computer program and computer software are intended to mean a sequence of instructions designed for execution on a computer system (e.g., a program and/or computer program, may include a subroutine, a function, a procedure, an object method, an object implementation, an executable application, an applet, a servlet, a source code, an object code, a shared library/dynamic load library and/or other sequence of instructions designed for execution on a computer or computer system).

The term uniformly is intended to mean unvarying or deviate very little from a given and/or expected value (e.g., within 10% of). The term substantially is intended to mean largely but not necessarily wholly that which is specified. The term approximately is intended to mean at least close to a given value (e.g., within 10% of). The term generally is intended to mean at least approaching a given state. The term coupled is intended to mean connected, although not necessarily directly, and not necessarily mechanically.

The terms first or one, and the phrases at least a first or at least one, are intended to mean the singular or the plural unless it is clear from the intrinsic text of this document that it is meant otherwise. The terms second or another, and the phrases at least a second or at least another, are intended to mean the singular or the plural unless it is clear from the intrinsic text of this document that it is meant otherwise. Unless expressly stated to the contrary in the intrinsic text of this document, the term or is intended to mean an inclusive or and not an exclusive or. Specifically, a condition A or B is satisfied by any one of the following: A is true (or present) and B is false (or not present), A is false (or not present) and B is true (or present), and both A and B are true (or present). The terms a and/or an are employed for grammatical style and merely for convenience.

The term plurality is intended to mean two or more than two. The term any is intended to mean all applicable members of a set or at least a subset of all applicable members of the set. The phrase any integer derivable therein is intended to mean an integer between the corresponding numbers recited in the specification. The phrase any range derivable therein is intended to mean any range within such corresponding numbers. The term means, when followed by the term "for" is intended to mean hardware, firmware and/or software for achieving a result. The term step, when followed by the term "for" is intended to mean a (sub) method, (sub)process and/or (sub)routine for achieving the recited result. Unless otherwise defined, all technical and scientific terms used herein have the same meaning as commonly understood by one of ordinary skill in the art to which this present disclosure belongs. In case of conflict, the present specification, including definitions, will control.

The described embodiments and examples are illustrative only and not intended to be limiting. Although embodiments of the present disclosure can be implemented separately, embodiments of the present disclosure may be integrated into the system(s) with which they are associated. All the embodiments of the present disclosure disclosed herein can be made and used without undue experimentation in light of the disclosure. Embodiments of the present disclosure are not limited by theoretical statements (if any) recited herein. The individual steps of embodiments of the present disclosure need not be performed in the disclosed manner, or combined in the disclosed sequences, but may be performed in any and all manner and/or combined in any and all sequences. The individual components of embodiments of the present disclosure need not be combined in the disclosed configurations, but could be combined in any and all configurations.

Various substitutions, modifications, additions and/or rearrangements of the features of embodiments of the present disclosure may be made without deviating from the scope of the underlying inventive concept. All the disclosed elements and features of each disclosed embodiment can be combined with, or substituted for, the disclosed elements and features of every other disclosed embodiment except where such elements or features are mutually exclusive. The scope of the underlying inventive concept as defined by the appended claims and their equivalents cover all such substitutions, modifications, additions and/or rearrangements.

It will be appreciated by those skilled in the art that changes could be made to the embodiments described above without departing from the broad inventive concept. It is understood, therefore, that this disclosure is not limited to the particular embodiments herein, but it is intended to cover modifications within the spirit and scope of the present disclosure as defined by the appended claims.

The invention claimed is:

1. A method, comprising operating a data distribution system including a data distribution module and a plurality of host-bus adapters coupled to the data distribution module including:
    defining a coherent group that includes a set of members that includes the plurality of host-bus adapters;
    providing a mirror group-coherent memory area in each of the set of members;
    initiating a one-to-all broadcast message from a one of the set of members to each member of the set of members, including the one of the set of members, ensuring that when the one of the set of members requests a write to its mirror group-coherent memory area, the one-to-all broadcast message maintains temporal memory coherency across all members of the set of members of the coherent group; and,
    wherein the mirror group-coherent memory area in each of the set of members is physically mirrored with a temporal coherence in that reads are not delayed or controlled by semaphores and no semaphores or access enables are required to achieve the temporal coherence of the coherent group.

2. The method of claim 1, wherein the one-to-all broadcast message is transmitted on a priority channel.

3. The method of claim 2, wherein the priority channel is lock-free and semaphore-free.

4. The method of claim 1, further comprising ensuring that when the one of the sets of members requests the write the one-to-all broadcast message maintains temporal memory coherency across all of the set of members of the coherent group including the one of the set of members that request the write.

5. The method of claim 1, wherein the coherent group includes multiple priority levels and wherein the mirror group-coherent memory area in each of the set of members is physically mirrored with a temporal coherence on each multiple priority level and no semaphores or access enables are required to achieve the temporal coherence of the coherent group.

6. An apparatus, comprising: a data distribution system including a data distribution module and a plurality of host-bus adapters coupled to the data distribution module and a processor coupled to a memory; the memory including a set of instructions, that when executed by the processor, causes the apparatus to carry out the steps of: defining a coherent group that includes a set of members that includes the plurality of host-bus adapters; providing a mirror group-coherent memory area in each of the set of members; initiating a one-to-all broadcast message from a one of the sets of members to each member of the set of members, including the one of the set of members, ensuring that when the one of the sets of members requests a write, to update its mirror group-coherent memory area, the one-to-all broadcast message maintains temporal memory coherency across all members of the set of members of the coherent group; and, wherein the mirror group-coherent memory area in each of the set of members is physically mirrored with a temporal coherence in that reads are not delayed or controlled by semaphores and no semaphores or access enables are required to achieve the temporal coherence of the coherent group.

7. The apparatus of claim 6, further comprising a computing, storage or networking element coupled to each of the plurality of host-bus adapters.

8. The apparatus of claim 6, further comprising another data distribution module coupled to the data distribution module.

9. The apparatus of claim 6, wherein the coherent group includes multiple priority levels and wherein the mirror group-coherent memory area in each of the set of members is physically mirrored with a temporal coherence on each multiple priority level and no semaphores or access enables are required to achieve the temporal coherence of the coherent group.

* * * * *